United States Patent
Dentamaro et al.

(10) Patent No.: US 9,276,998 B2
(45) Date of Patent: Mar. 1, 2016

(54) TRANSFER OF FILES WITH ARRAYS OF STRINGS IN SOAP MESSAGES

(75) Inventors: Vicenzo Dentamaro, Rutigliano (IT); Francesco Sardella, Rome (IT); Mario Somma, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 372 days.

(21) Appl. No.: 13/617,007
(22) Filed: Sep. 14, 2012
(65) Prior Publication Data

US 2013/0091230 A1    Apr. 11, 2013

(30) Foreign Application Priority Data

Oct. 6, 2011    (EP) .................................... 11184126

(51) Int. Cl.
| | |
|---|---|
| G06F 15/16 | (2006.01) |
| H04L 29/08 | (2006.01) |
| G06F 9/46 | (2006.01) |
| G06F 17/22 | (2006.01) |
| G06F 9/50 | (2006.01) |
| H04L 12/58 | (2006.01) |
| H04L 29/06 | (2006.01) |

(52) U.S. Cl.
CPC ............... *H04L 67/06* (2013.01); *G06F 9/465* (2013.01); *G06F 9/5055* (2013.01); *G06F 17/2247* (2013.01); *H04L 51/14* (2013.01); *H04L 63/0428* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,502,754 | B2 * | 3/2009 | Campbell | G06Q 30/04 380/255 |
| 7,529,793 | B2 * | 5/2009 | Itoh | H04L 67/2804 709/201 |
| 7,660,902 | B2 * | 2/2010 | Graham | G06F 21/6245 709/203 |
| 7,904,710 | B2 * | 3/2011 | Rits | G06F 21/606 705/75 |
| 8,725,759 | B2 * | 5/2014 | Baxter | G06F 17/2247 707/769 |
| 2003/0212818 | A1 * | 11/2003 | Klein | H04L 51/12 709/238 |
| 2006/0168052 | A1 * | 7/2006 | Srinivasan | H04L 12/5855 709/206 |
| 2007/0016897 | A1 * | 1/2007 | Todd | G06F 9/5055 717/143 |
| 2007/0150478 | A1 * | 6/2007 | Cho | H04L 29/12113 |
| 2007/0180132 | A1 * | 8/2007 | Purdy | G06F 9/465 709/230 |

(Continued)

OTHER PUBLICATIONS

Heinzl, Steffen, et al. "Flex-swa: Flexible exchange of binary data based on soap messages with attachments." Web Services, 2006. ICWS'06. International Conference on. IEEE, 2006.*

*Primary Examiner* — Ranodhi Serrao
*Assistant Examiner* — James Fiorillo
(74) *Attorney, Agent, or Firm* — Cuenot, Forsythe & Kim, LLC

(57) ABSTRACT

A method of transferring files in a data-processing network using a current node within the network includes reading an outbound content and outbound characteristics of an outbound file. An outbound message is created having outbound strings including a first set of the outbound strings representing the outbound characteristics and a second set of the outbound strings representing the outbound content. The outbound message is sent to a receiver node within the network. An inbound message is received from a sender node within the network. The inbound message has inbound strings including a first set of the inbound strings representing inbound characteristics and a second set of the inbound strings representing inbound content. An inbound file having the inbound content is stored, and the inbound characteristics are applied to the inbound file.

12 Claims, 7 Drawing Sheets

(56) References Cited

U.S. PATENT DOCUMENTS

| | | | | |
|---|---|---|---|---|
| 2008/0216052 A1* | 9/2008 | Hejlsberg | G06F 9/4428 | 717/114 |
| 2009/0307493 A1* | 12/2009 | Smith | H04L 63/166 | 713/170 |
| 2010/0223462 A1* | 9/2010 | Do | H04L 67/06 | 713/165 |
| 2010/0332825 A1* | 12/2010 | Bradley, II | H04L 63/0823 | 713/158 |
| 2011/0067059 A1* | 3/2011 | Johnston | G10L 15/30 | 725/39 |
| 2011/0119378 A1* | 5/2011 | Hinks | H04L 67/02 | 709/224 |
| 2012/0260156 A1* | 10/2012 | Tsao | H04L 63/20 | 715/234 |

* cited by examiner

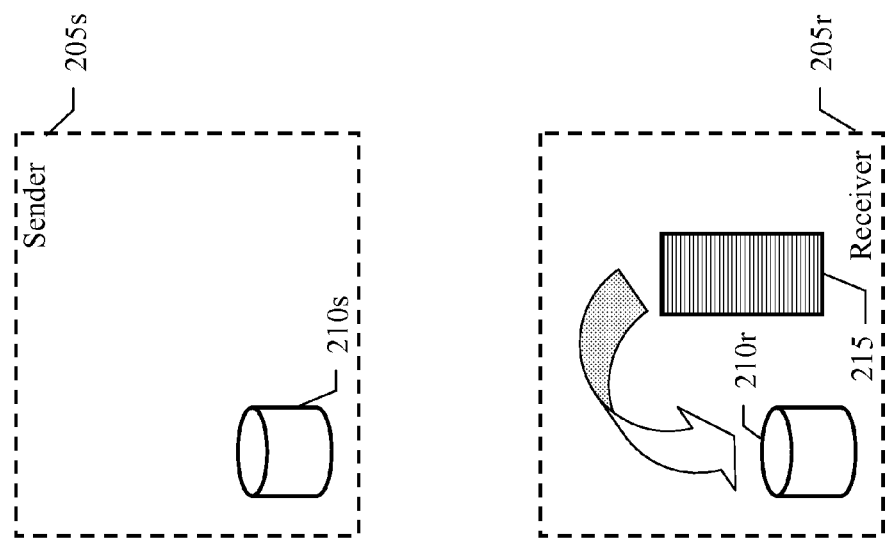

TRANSFER OF FILES WITH ARRAYS OF STRINGS IN SOAP MESSAGES

CROSS-REFERENCE TO RELATED APPLICATIONS

This application claims the benefit of European Application Number 11184126.8, filed on Oct. 6, 2011, which is incorporated herein by reference in its entirety.

BACKGROUND

1. Field

The present disclosure relates to data processing, and more specifically, to a transfer of files with arrays of strings in SOAP messages.

2. Description of the Related Art

Transfer of information is the main activity in a data-processing network; particularly, this comprises the transfer of files that are stored on non-volatile memories of the network in a durable way (so as to remain available even after their current use).

A typical example is in web services, wherein a collection of services (i.e., stand-alone basic tasks) may be exploited over the Internet through an interface being formally defined in a public document (irrespectively of the actual implementation of the offered services)—for example, in the Web Services Description Language (WSDL). The web services have become the standard platform for application integration, being the fundamental building blocks in the move to distributed computing on the Internet. For this purpose, the web services are accessed via ubiquitous transport protocols (as specified in their WSDL documents).

An example of transport protocol that is commonly used to transfer information in web services is the Simple Object Access Protocol (SOAP). The SOAP is a high-level transport protocol based on the Extensible Markup Language (XML), which allows the transfer of messages between heterogeneous nodes—independently of the bounding of the SOAP messages to the actual transport protocols that are used to convey them.

However, few techniques are available to transfer files via SOAP messages. For example, US-A-2010/0223462 (the entire disclosure of which is herein incorporated by reference) discloses a technique for exposing a file system of a Local Area Network (LAN) behind its firewall to a remote device through web services. For this purpose, messages conforming to a file sharing protocol (such as the CIFS) are included into SOAP messages with attachments (Swa). However, the SOAP messages with attachments are not of general applicability. The alternative possibility of embedding the CIFS messages into the CDATA field of the SOAP messages is instead discarded because of its overhead.

Another known technique for transferring binary data via SOAP messages is the Message Transmission Optimization Mechanism (MTPM); in this case, the specification of the SOAP messages is updated to support the transmission of the binary data separately.

However, all the known techniques modify the standard SOAP specification; for example, this result is achieved by extending the core functionality of the standard SOAP specification with additional dedicated features, or by defining a proprietary version of the SOAP specification. In any case, this makes the available techniques not of general applicability, thereby hindering their integration. A further problem relating to the transfer of files via SOAP messages is their security.

With reference to the transfer of simple data via SOAP messages, some techniques have been proposed for encrypting this data. For example, US-A-2005/0081039 (the entire disclosure of which is herein incorporated by reference) discloses a technique for verifying encrypted SOAP messages. For this purpose, a SOAP message is created by inserting data (to be sent to a recipient) encrypted using a session key into its body, and a signature of part of the data, the session key and the signature encrypted using a public key of the recipient into its header; the recipient of the SOAP message decrypts the session key and the signature with its private key, and then uses the session key to decrypt the signature (in order to verify it) and the data. This allows protecting the SOAP message against any signature forgery. However, this technique does not ensure a very high degree of security.

With reference instead to the transfer of files via SOAP messages, the above-mentioned document US-A-2010/0223462 mentions the possibility of establishing secure connections through a Virtual Private Network (VPN). However, the VPN involves high resource consumption, takes time to start up and does time-out when there is no activity (so that is may be untenable in specific applications—for example, with mobile devices or wireless networks).

BRIEF DESCRIPTION OF THE SEVERAL VIEWS OF THE DRAWINGS

The invention may be better understood by combining the description referring to drawings below, in which the same or similar reference numbers represent the same or similar components throughout the drawings. The drawings are included within the description and constitute a part of the description along with the detailed description below, and are used to explain the preferred embodiments of the invention illustratively and illustrate the principal and advantage of the embodiments of the invention. In the drawings.

FIGS. 2A-2C show an exemplary scenario of application of the data processing system.

DETAILED DESCRIPTION

Figure 1:
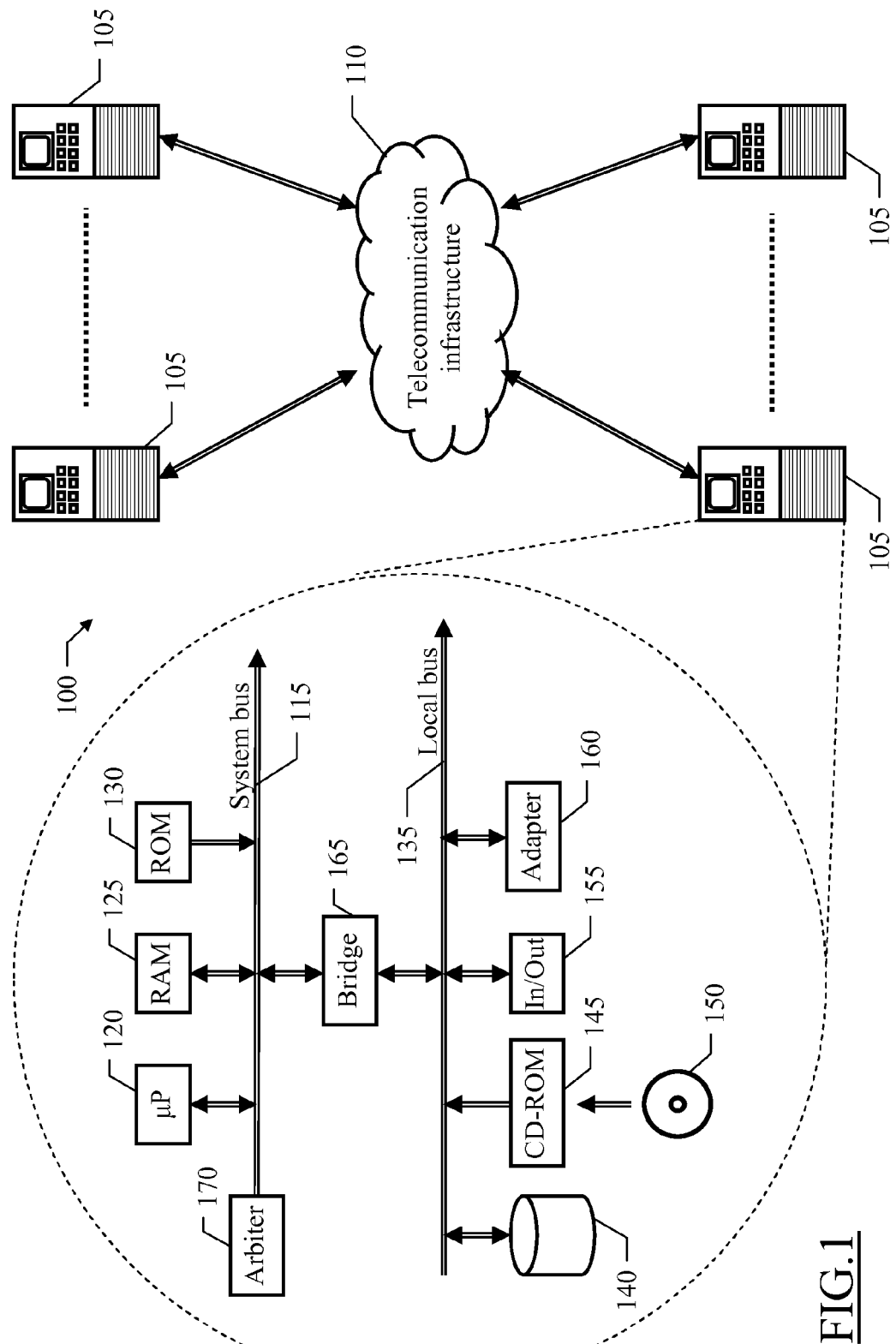
FIG. 1 shows a schematic block diagram of a data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain (or store) a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. Each block of the flowchart illustrations and/or block diagrams, and combinations of blocks in the flowchart illustrations and/or block diagrams, can be implemented using computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference in particular to FIG. 1, the system 110 has a distributed architecture based on a network of computers 105, which communicate through a telecommunication infrastructure 110 (for example, based on the Internet).

Each computer 105 is formed by several units that are connected in parallel to a system bus 115 (with a structure that is suitably scaled according to the actual function of the computer 105 in the system 100). In detail, one or more microprocessors (µP) 120 control operation of the computer 105; a RAM 125 is used as a working memory by the microprocessors 120, and a ROM 130 stores basic code for a bootstrap of the computer 105. Several peripheral units are clustered around a local bus 135 (by means of respective interfaces). Particularly, a mass memory comprises one or more hard disks 140 and drives 145 for reading DVD- or CD-ROMs 150. Moreover, the computer 105 comprises input/output units 155 (for example, a keyboard, a mouse, a monitor, and USB ports). A network adapter 160 is used to connect the computer 105 to the telecommunication infrastructure 110. A bridge unit 165 interfaces the system bus 115 with the local bus 135. Each microprocessor 120 and the bridge unit 165 may operate as master agents requesting an access to the system bus 115 for transmitting information. An arbiter 170 manages the granting of the access with mutual exclusion to the system bus 115.

Figure 2B:
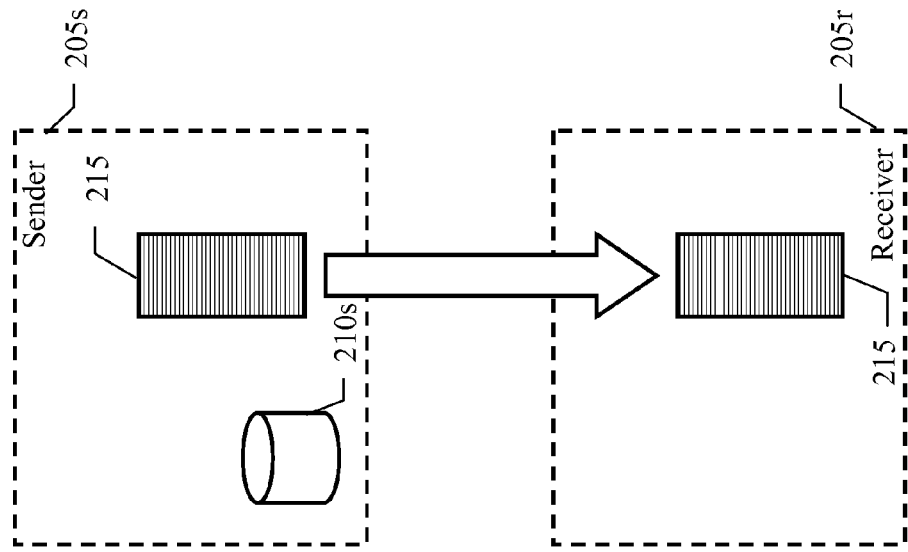
Figure 2A:
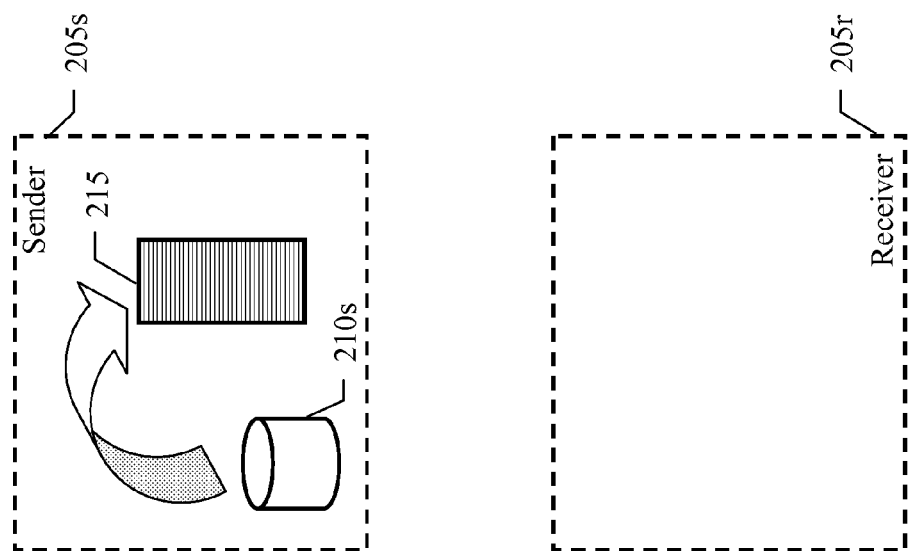

Starting from the FIG. 2A, a computer acting as a sender node of the network, or simply sender (denoted with the reference 205s) has to send a file 210s to another computer acting as a receiver node of the network, or simply receiver (denoted with the reference 205r).

The sender 205s reads the content of the file 210s and its characteristics. The sender 205s then creates a message 215 (for example, a SOAP message) comprising a set of strings representing the characteristics of the file 210s (for example, name, access permissions and dates) and its content (suitably converted if necessary); optionally, the strings representing the content of the file 205s may also be encrypted (for example, with a public key of the receiver 205r).

Moving to the FIG. 2B, the message 215 is sent from the sender 205s to the receiver 205r. As soon as the message 215 is received by the receiver 205r, as shown in the FIG. 2C, its strings are extracted. A file 210r is then stored onto the receiver 205r with its content based on the corresponding strings of the message 215 (suitably converted if necessary); optionally (if these strings have been encrypted), they are decrypted before creating the file 210r (for example, with a private key of the receiver 2105r). The characteristics indicated in the corresponding strings of the message 215 are then applied to the file (for example, to assign its name, and to set its access permissions and dates).

The above-described solution is very simple and of general applicability. For example, in an aspect of the disclosure the files may be transferred in the context of web services. Each web service consists of a repeatable task that may be performed by any providers on behalf of any consumers. The web service (and especially its interface to be invoked by the consumers) is formally described in a corresponding WSDL document, which is written in an XML-based specification conforming to the Universal Description, Discovery and Integration (UDDI) standard. Particularly, the WSDL document defines the messages that may be transferred among the producers and the consumers, and the binding of these messages to transport protocols implementing them.

One of the most common transport protocols used in web services is the SOAP. The SOAP is a high-level transport protocol allowing the transfer of messages between heterogeneous nodes, with the SOAP messages that travel from an (initial) sender to an (ultimate) receiver, possibly by passing through a set of intermediary nodes along a corresponding path. For each node along this path, the SOAP messages are bound to an actual transport protocol, which provides a serialized representation of the SOAP message allowing it to be conveyed to the next node (with each node that may exploit a different transport protocol). The SOAP supports the most common transport protocols, such as the HyperText Transfer Protocol (HTTP).

Each SOAP message consists of an XML-based document, which is enclosed within an envelope qualifying the content of the SOAP message. The envelope comprises a header (consisting of an optional element that may be used to extend the SOAP message with additional functions targeted to any node) and a body (consisting of a mandatory element that has to be processed by the receiver). The body is encoded according to predefined rules that define specific types of data that are supported. For this purpose, the (standard) SOAP specification defines simple types for simple values without named parts, and compound types for compound values consisting of aggregates of simple values (distinguishable according to their roles). Particularly, the SOAP specification defines strings (i.e., sequences of characters), and arrays of strings (i.e., aggregates of strings distinguishable according to their ordinal positions within the arrays).

In certain aspects, each file is sent (from the sender to the receiver) by representing it as an array of strings in the body of a SOAP message (without any extensions in its header). This allows using standard SOAP messages. Therefore, the transfer of the files is completely independent of the version and extension of the SOAP messages (thereby avoiding any incompatibility problem among the nodes of its path). All of the above fosters the integration of heterogeneous applications, especially in the Internet.

More specifically, the array of strings is (logically) divided into a title portion and a payload portion. The title portion represents the characteristics of the file (in addition to other service information). The payload portion instead represents the content of the file.

In certain aspects, the content of the file is converted from its binary format into a text format (i.e., encoded with printable characters)—for example, a Base64 format. In this case, in each group of 3 bytes (24 bits) of the binary format, each block of 6 bits (whose value ranges from 0 to 63) is converted into an ASCII character (1 byte)—so as to obtain 4 ASCII characters defining a 64Base character. The ASCII characters comprise the case-sensitive characters A-Z and a-z, the numbers 0-9, the plus sign (+) and the slash sign (/); when the last group contains 1 byte only, 4 bits at the 0 value are added to obtain 12 bits that are converted into a 64Base character formed by 2 ASCII characters plus two padding characters "=", whereas when the last group contains 2 bytes only, 2 bits at the 0 value are added to obtain 18 bits that are converted into a 64Base character formed by 3 ASCII characters plus a padding character "=". In this way, it is possible to reduce any risk of corruption of the content of the file during the transfer of the SOAP message along its path (for example, due to incorrect formatting of some special characters).

For example, the title portion used to transfer files in normal (i.e., not encrypted) form consists of the first 10 strings of the array of strings, whose meaning is defined as follows according to their position within the array of string (starting from 0):

string 0: keyword "File", indicating the start of the title portion of the array of string for a normal file, string 1: name (with extension) of the file, string 2: size of the file in bytes, string 3: identifier representing an access permission of the file—for example, defined in Unix-style with the number 0 (nothing), 1 (execute only), 2 (write only), 3 (write and execute), 4 (read only), 5 (read and execute), 6 (read and write) or 7 (read, write and execute), string 4: time stamp—for example, in the Coordinated Universal Time (UTC) format—representing a last write access to the file, string 5: hash value—for example, based on the MD5 message digest algorithm—of the file, string 6: identifier representing a nature of the file—for example, the content-type of the Multipurpose Internet Mail Extensions (MIME) specification (i.e., "application", "audio", "image", "message", "multipart", "text", "video" or "x-token", followed by its sub-type separated by the symbol "/"), string 7: position in the array of strings of the first string of the payload portion (i.e., position of the string 0+10 in the example at issue), string 8: position in the array of strings of the last string of the payload portion (depending on the content of the file and on its representation), and string 9: keyword "/File", indicating the end of the title portion.

For example, a generic file called "Stub.jar", consisting of 6918 bytes, accessible in read and write (6), whose last write access was at 5:07:20 PM of 22 Mar. 2011, whose MD5 hash value is "c799554c83d93aab079f2bd9bc0cbe60", whose MIME content-type is "application/unknown", and whose content is stored in a single Base64 string may be represented with the following array of strings:

```
<ArrayOfString .... >
  <string>File</string>
  <string>Stub.jar</string>
  <string>6918</string>
  <string>6</string>
  <string>3/22/2011 5:07:20 PM</string>
  <string>c799554c83d93aab079f2bd9bc0cbe60</string>
  <string>application/unknown</string>
  <string>10</string>
  <string>10</string>
  <string>/File</string>
<string>
  UEsDBBQACAAIAKWYdj4AAAAAAAAAAAAAAAAUAAQATUVUQS1JTkYvTUFOSUZFU1Qu
  TUb+ygAA803My0xLLS7RDUstKs7Mz7NSMNQz4OXi5QIAUEsHCLJ/Au4bAAAAGQAAAFBLA
```

-continued

```
wQUAAgACAAdiXY+AAAAAAAAAAAAAAAAKQAAAHBzZGkvY29tbW9uL014QnJpZGdlL014Q
nJpZGdlTG9jYXRvci5qYXZh3Vhdb9s2FH0PkP9w4Sc58+gkaLvBQTBk+cAyJENWp+hjwUi0zFW
iNJJKHBT977ukRVmmRDsOsj1MD44TUud+nnPJjA8O9vfgAG4Xv0qepOymiKkuJPmLPlKzYBfv
51zBjGcMnqgCWunix5QJJqlmCcxkkcPn6cWN3frwDHrO4KyksfmxwBePyDv8XcLx8QiODw8/Q
HT4YfL+/eTdz3B3cT+07x7/jvaA5VxrJolBGu/v7e8hyleaMihVwklc5HkhiPP0xG6oHjIeQ5xRpfwYg
C00E4mCQqaEWocIRYdInHEmNJky+chjBjwvM5bjX1SvneYLfDMWx17C4DN7AAc1Q6u3TFP1
rJoYAJ/aTc/BaGggzfp3s3HjVj+GS5Fywc4LMeNphYXghYDY/taAmkdVJZNRvXDSMrbBlCk9yah
IyVRLLlJ4UkmGiyMwKwuyyDMiaM4UusPIn3/gV1Dmc4ill8WTau2TZezyfLmIWWn97PjXGFjC
+H6Ox/BJMdAFpEwDhVIWi+e65jbjdQDTgpZ1ZJI/YnNCJ5T21i80SSRDjFMYzLUuJ+NxhinI5o
XSk6Pjo5/GTQtQlS8GJ17eOuDoXRv/bAkfrRVEMl1J0etHT9j3yCGkxwWousFM3iFhM1pl2K6YE
UO2spDarpAdojewdWVsBTEJ7eWdo/Xwtkbt7Q/05mPBEwx+o6WOZ8L2Ysv85rhF2PxGPTBofha
i3Tlg3RdMk08fbwD1qiy40Ccr57V8bsdiHrfLOM+e1hCivs4atuC+r74i3eM5RM3rtzRDOuUsQZyVp
+uptB6ZCBvL4SAjFjBct4OfOxdWSKh2r8Zabg1Nak6+Qql6yrDVn6muHuCLMp/LSr3ojajI6Agd5
Wv1M4+FJEiLO9xpObCNjD5CXQELtLE5/LljJvqVUZ+evqhBRZVlXcyXMPuybgCnnB1mu34Ok
bsl6SFRtePbPAdwhbPD6GfKH5kAtMvkDEfayI4Zs2Ar1xwP7JAlzdvXM1ubRprneDQSxVKMZw
Hk5mVcFNBpN0SzfbmyMu5qsMw5+cjyAgU+XXZAdG5HYe2IS+K1s/o2zc5nEG1tX2KHMuHqT
CmeCvqQsSs8HkZB1zo99G/y6mVa2U+5t6HdBup59AvItCXDvSmnyS3o12uzDmjziwEGeDiRzPQs
dn0PUxoSNO0//ARjADxDsBjg9teIBv8DA/BzAJNjUBFNf57h7Xvw/cjx89i7rbhzBm+uAJX0N76oT
kn3naNB8f791NJ6LsmoYhvx29k3FzRUlu6NopY1mvFw/vBL2d0UzFa1hdcUmcA4JeMoyvIT4EH
65nCrtkg3zRJ1J626piDdcwg7XtMflZbfR7o/hcFthBNvO8+sq4QFE7lLlcjsYra4Yg+4Zr31pqTTPyG
9UzafIUhOomej1uaLLFrv7Wpv/RyAn68x79y7XySrYxo0ZNyXaTkR+lu1ugjMjen0SbKsON5+Rl3Z
4HVwU1roDmNaK1twO3GHIKRZUqWcxnnCWdG6OnQe5stvU8tpKe8FFtZ9HZ3wsTugxyectRcvN
NyFJ7f++b/VeD+CpQnsE0ERHbrxywAzinQhTaeAbOHThr1aRtyQzGPkb7tP3P671t5rxh4Xs8CIj/
CLx62vzgxz9QSwcIeOZJpMcEAADPFAAAUEsDBBQACAAIAB2Jdj4AAAAAAAAAAAAAAAAm
AAAAcHNkaS9jb20ucHNkaS9jb21tb24vY29tbW9uL014QnJpZGdlTG9jYXRvci5qYXZh
```

-continued

```
q0p32NxnszN36Dcpfxkh8EdjJoo5kWvJsyYYcqPqenFD8es5FO+8aImU2+DypJIAx2OKSeNrBt0C
qrqtp5tNT7trwWf9GfPVUD1ckCVaZGfHbHqhSN7C7Hs6np9aIa6nohnuheZcsH7MRBtkD0BY01
gVgGWBrAOVglYxedwVVi1dqzKNcZPClMVNlXYtHpsmhy0UGHTy2HT2xVjU8FxTxU2vQQ2ZR
ujwqYKmypsIvG+ajJON0Cve9nvvEBy7mQDTZFkP/5WA9i7VQJYwdFDFXqtHb2yLfGTQlduxKs
DPBnPW4BlmSQb98cYy2pmnJGjXKyAxTNgm073gtg2fRrHPJt/tMkXn2yY/EHALt5UrSMNZLIZ
eKtx7v0qca7oxJMK6NYOdFNNsRlIl47uyVDeAoirpmvPhWbw629QSwcIQ5cLsX4KAADSeQAAU
EsDBBQACAAIACCJdj4AAAAAAAAAAAAAAAAiAAAAcHNkaS9jb21tb24vTXhCcmlkZ2UvTXh
CcmlkZ2UuamF2YaWQUUvDMBSF3wv9D/exLZrWsg2ZT5P5IhuInew5bW+7aJuEJNs6xP9uUto
xhoJgXkIu55x7vsRR5HsQwbp7VKyskbzTA3WTfrrZMQ0VaxCOVAPdG3FbI0dFDZZQKdHCNIu
ueml+ArNDWEhauKuzxjsysW8FaXoDaZLMIEhm8+l0PrmHl+Um7L3ps90H2DJjUBGXFPue79
mUD1ojSF0yUoi2FZyMFR96wT5vWAGMW1tFCzwDAHYGeanBgXSkaxuiZEEyVAdmZZ/OHF9
BwxZzGBWVULBGQ/VJD3XAnmGfCyUN5TXJjGK8hhrNmJIJKhdlqVDrIOxLXhh/AiGXzuukIL
T/qcTxF5CnrkBpmOD/X9QzcTTk7XUFUigzQPy9wJfvfQNQSwcIK7FjkiEBAABIAgAAUEsDBB
QACAAIAHWJdj
</string>
</ArrayOfString>
```

As another example, the title portion used to transfer files in encrypted form consists of the first 13 strings of the array of strings, whose meaning is defined as follows according to their position within the array of string (starting from 0):

string 0: keyword "EncryptedFile", indicating the start of the title portion of the array of string for an encrypted file, string 1: name (with extension) of the file, string 2: size of the file in bytes, string 3: identifier representing the access permission of the file as above, string 4: time stamp representing a last write access to the file as above, string 5: hash value of the file as above, string 6: identifier representing the nature of the file as above, string 7: identifier describing an encryption algorithm used to encrypt the each string of the payload portion of the array of strings—i.e., the content of the file (for example, the keyword "RSA-1024" for the RSA encryption algorithm at 1024 bits), string 8: public key of the receiver (for example, expressed in Base64 format) used to encrypt the payload portion, string 9: modulus of the encryption algorithm (for example, expressed in Base64 format) used to encrypt the payload portion, string 10: position in the array of strings of the first string of the payload portion (i.e., position of the string 0+13 in the example at issue), string 11: position in the array of strings of the last string of the payload portion (depending on the content of the file, on its representation and on its encryption), and string 12: keyword "/EncryptedFile", indicating the end of the title portion.

Figure 3:
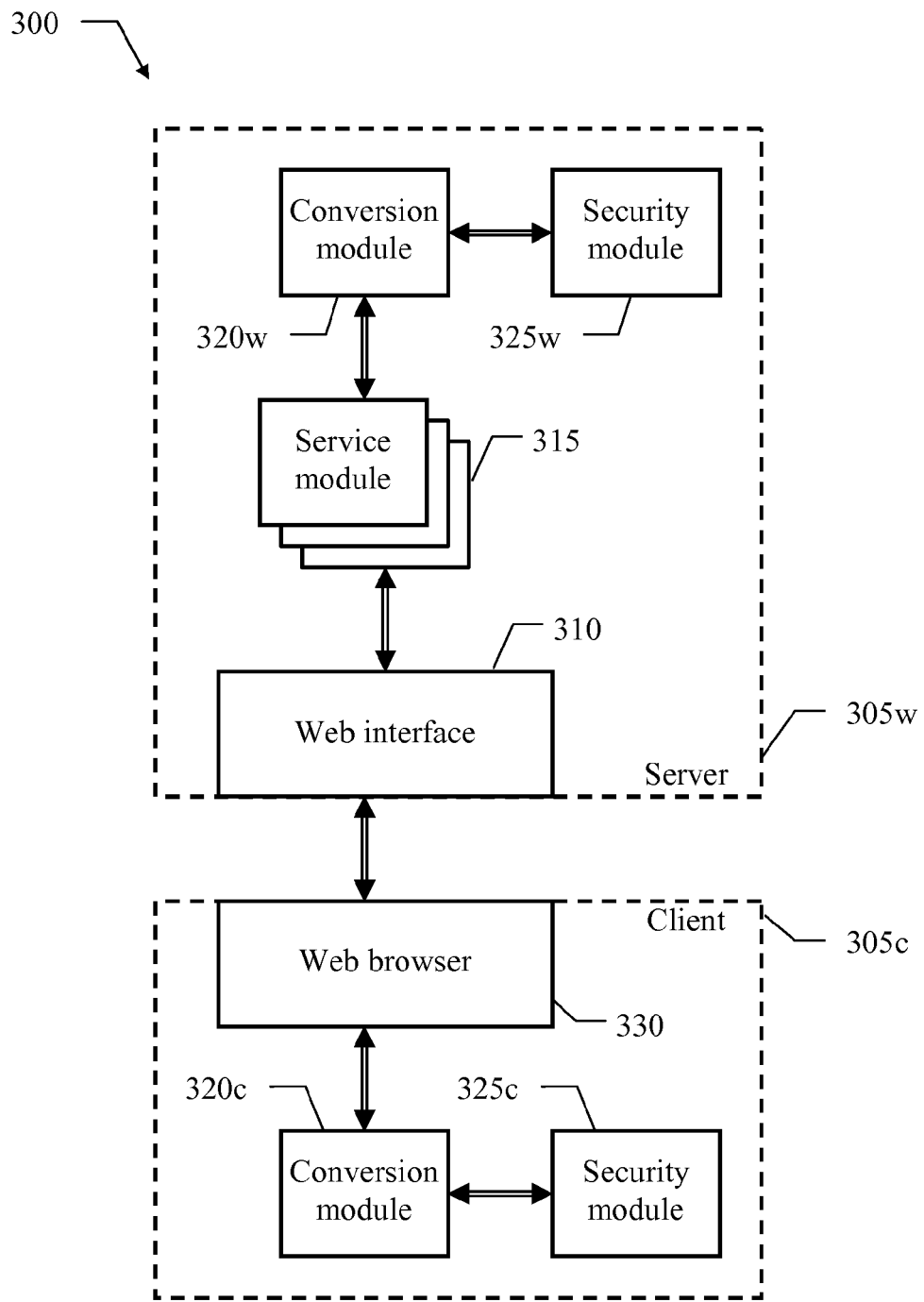
FIG. 3 shows application components.

The main application components that may be used to implement the solution according to an aspect of the disclosure are illustrated in the FIG. 3. These application components are denoted as a whole with the reference 300. The information (programs and data) is typically stored in the hard-disk and loaded (at least partially) into the working memory of each computer when the applications are running, together with an operating system and other application programs (not shown in the figure). The applications are initially installed onto the hard disk, for example, from DVD-ROM.

Particularly, a generic computer offering web services in the above-described system (denoted as server 305w) exposes a web interface 310 for invoking them. The web interface 310 communicates with one or more service modules 315, which actually implement the offered services. In the solution according to an aspect of the disclosure, the service modules 315 access a conversion module 320w, which converts files into SOAP messages and vice-versa. For this purpose, the conversion module 320w may also exploit a security module 325w, which is used to encrypt/decrypt the content of the files.

On the other hand, a generic computer exploiting the web services offered by the server 305w (denoted as client 305c) comprises a web browser 330 for accessing the web interface 310. In the solution according to an aspect of the disclosure, the web browser 330 accesses a further conversion module 320c (to convert files into SOAP messages and vice-versa), which may also exploit a further security module 325c (to encrypt/decrypt the content of the files).

Figure 4A:
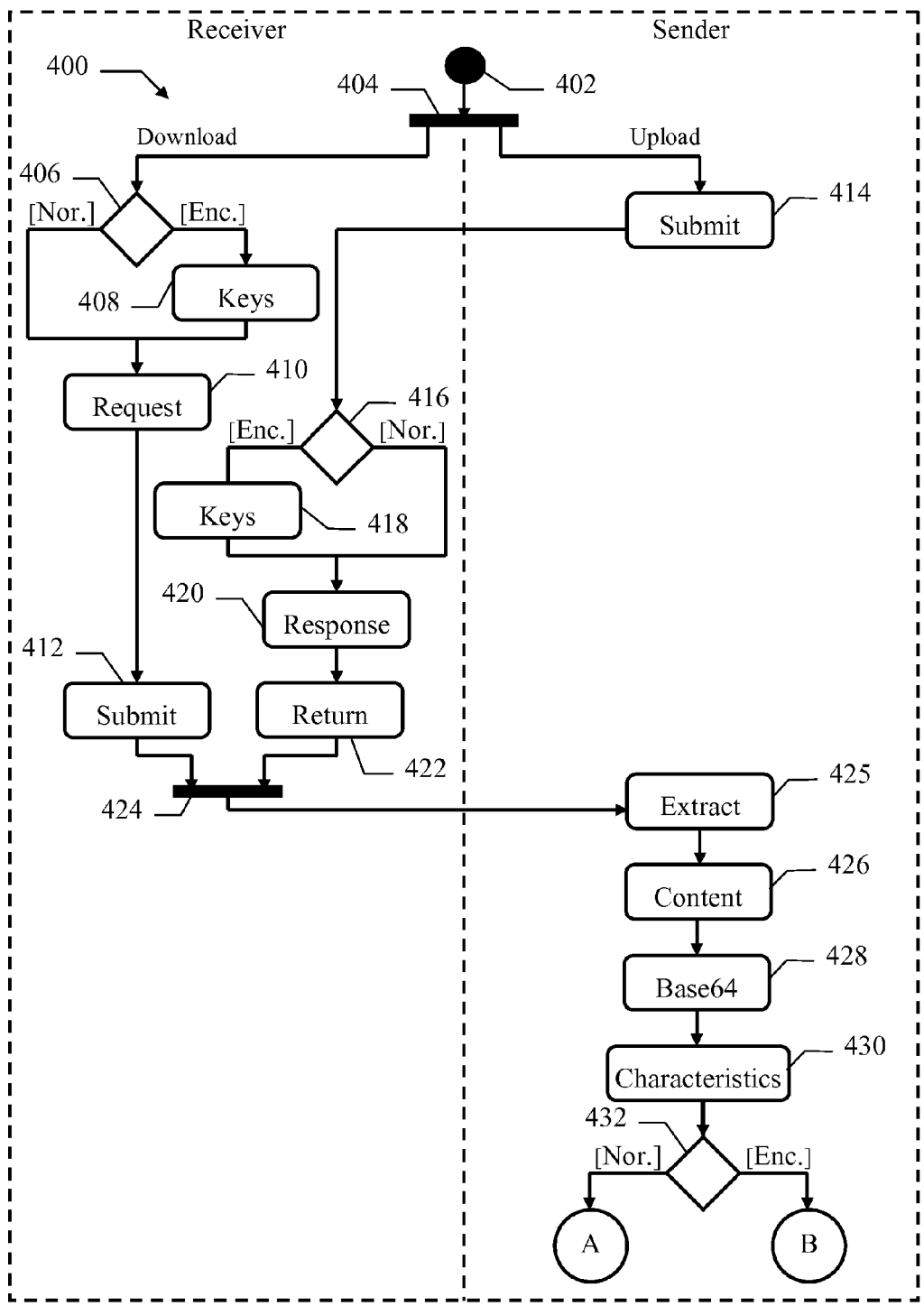
FIGS. 4A-4C show an activity diagram describing the flow of activities.
Figure 4B:
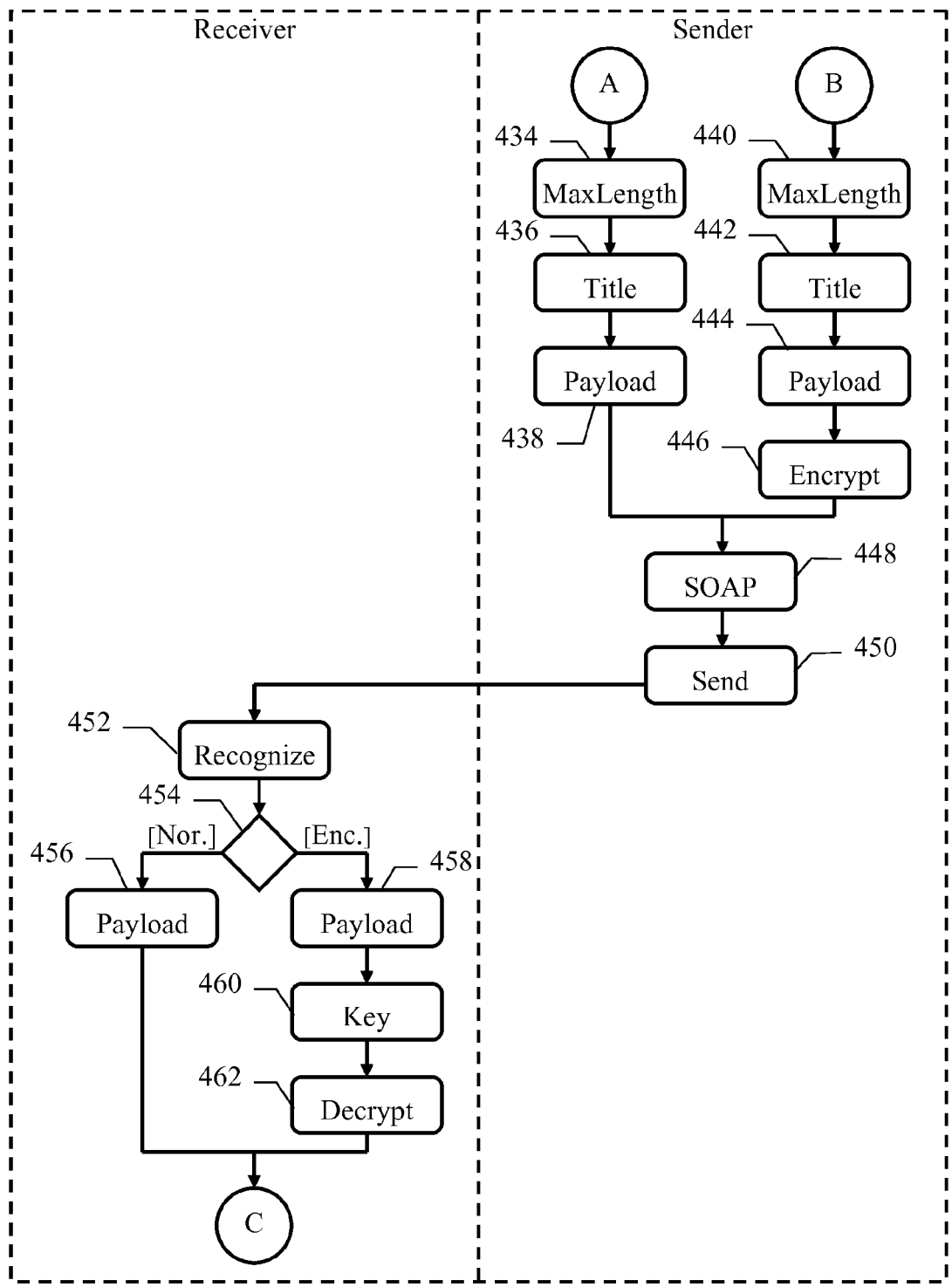
Figure 4C:
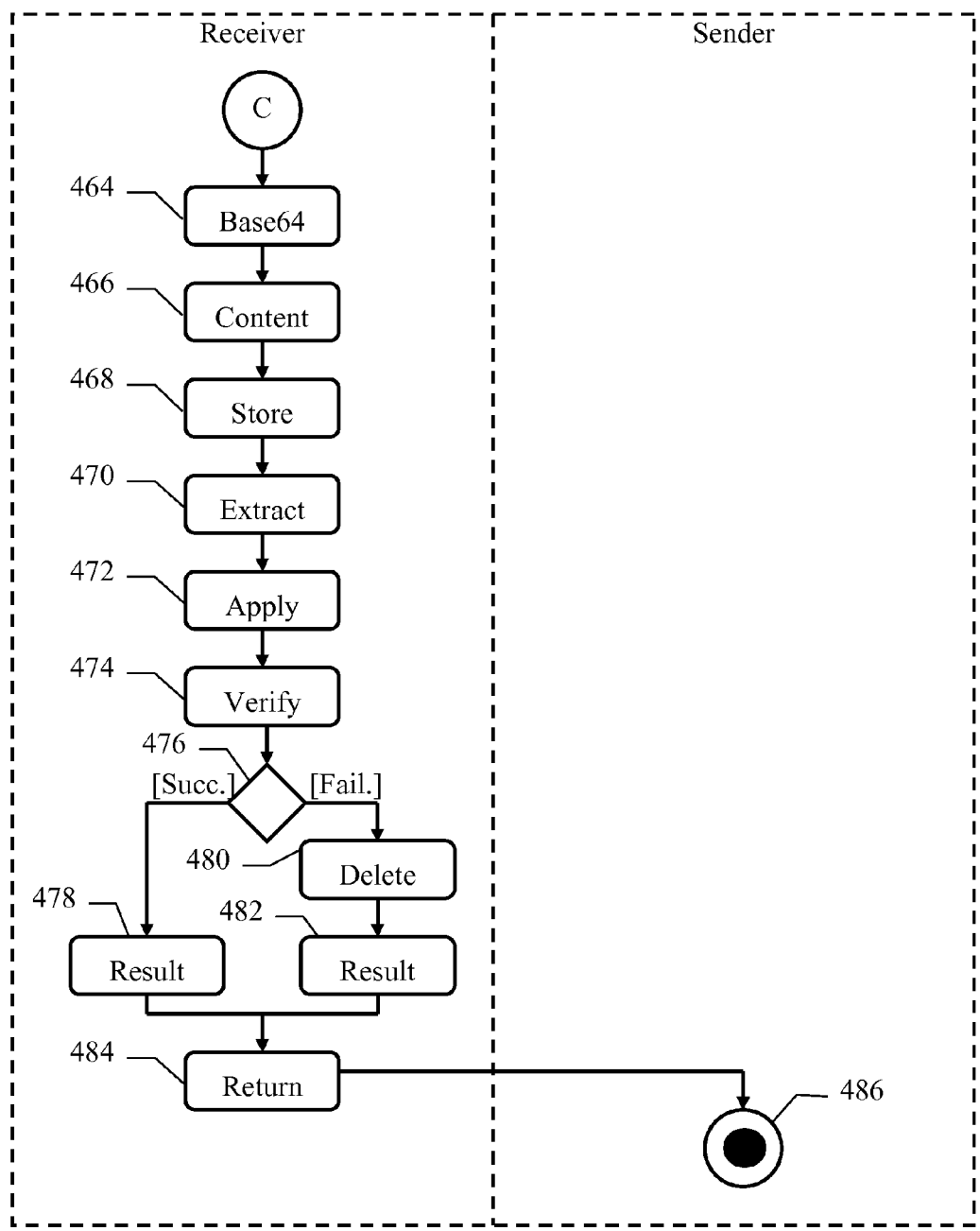

An activity diagram describing the flow of activities relating to an implementation of the solution according to an aspect of the disclosure is shown in FIGS. 4A-4C. Particularly, the diagram represents an exemplary process that may be implemented in the above-described system to send a file from a generic sender to a generic receiver with a method 400.

The process begins at the black start circle 402 and then forks at the synchronization bar 404 into two branches that are executed alternatively.

Particularly, if the receiver needs to download a file from the sender, the process passes to decision block 406 in the swim-lane of the receiver, wherein it branches according to the form in which the file has to be sent (i.e., normal or encrypted). When the file has to be sent in encrypted form, a new pair of private key and public key for the RSA algorithm (for example, at 1.024 bits), together with the corresponding modulus, is generated at block 408 (and stored into the mass memory of the receiver). The process then descends into block 410; the same point is also reached directly from the block 406 when the file has to be sent in normal form. In both cases, a corresponding download request (comprising the name of the file and possibly the public key and the modulus of the RSA encryption algorithm to be used to encrypt it) is created. The download request is then submitted to the sender at block 412.

Conversely, if the sender needs to upload a file onto the receiver, the process passes from the synchronization bar 404 to the block 414 in the swim-lane of the sender, wherein a corresponding upload request (comprising the name of the file and the form in which it has to be sent—i.e., normal or encrypted) is submitted to the receiver. Passing to the swim-lane of the receiver, the process branches at decision block 416 according to the form in which the file has to be sent. As above, when the file has to be sent in encrypted form, a new pair of private key and public key for the RSA algorithm, together with the corresponding modulus, is generated at block 418 (and stored into the mass memory of the receiver). The process then descends into block 420; the same point is also reached directly from the block 416 when the file has to be sent in normal form. In both cases, a corresponding upload response (possibly comprising the public key and the modulus of the RSA encryption algorithm to be used to encrypt the file) is created. The upload response is then returned to the sender at block 422.

The two branches described above joint at the further synchronization bar 424 (from the block 412 or from the block 422, respectively). Returning to the swim-lane of the sender at block 425, the name of the (outbound) file to be sent to the receiver (and possibly the public key and the modulus to be used to encrypt it) is extracted from the download request or from the upload response, respectively. With reference now to block 426, the content of the outbound file is read into an outbound array of bytes. Continuing to block 428, the outbound array of bytes is converted into an outbound Base64 string.

With reference now to block 430, the sender reads the characteristics of the outbound file (i.e., its size in bytes, access permissions in Unix-style, time stamp in UTC format, MD5 hash value, and MIME content-type in the example at issue). The flow of activity then branches at decision block 432 according to the form in which the outbound file has to be sent; if the outbound file has to be sent in normal form the blocks 434-438 are executed, whereas if the outbound file has to be to the sent in encrypted form the blocks 440-446 are executed (with the process that then passes to block 448 in both cases).

Referring to block 434 (normal form), a maximum length MaxLength of the strings in the array of strings (which will be used to send the outbound file) is set to a value that should ensure their correct management in most practical situations; for example, considering that several programming languages only support strings up to 32.767 ASCII characters, the maximum length MaxLength is set to 32.767 bytes=int (32.767/4)+1=8.191 64Base characters.

Proceeding to block 436, the sender starts filling a working outbound array outArray[ ] by inserting the information of the title portion of the array of strings at its correct position. For example, the operations of reading the characteristics of the outbound file and inserting the information of the title portion into the outbound array outArray[ ] may be performed together with the following instructions:

outArray[0]="File"
outArray[1]=filename
outArray[2]=file.size
outArray[3]=getFilePermission( )
outArray[4]=file.lastWriteAccessUTC
outArray[5]=getMD5Has(fileName)
outArray[6]=getMIMEType(fileName)
outArray[7]=StartTitle+10
outArray[8]=StartTitle+10+StringNum−1
outArray[9]="/File", wherein StartTitle is the position (known a priori) that the first string of the title portion will have in the array of strings, and StringNum=int(CharNum/MaxLength)+1, with CharNum equal to the number of Base64 characters in the Base64 string, is the number of strings that will taken by the payload portion in the array of strings.

The sender at block 438 then completes the filling of the outbound array outArray[ ] by inserting the information of the payload portion at its correct position. For this purpose, a loop is performed by extracting sub-strings in succession from the outbound Base64 string, each one consisting of a number of Base64 characters equal to MaxLength—i.e., the Base64 characters from i*MaxLength to (i+1)*MaxLength−1, with i starting from 0-up to a last sub-string consisting of the remaining Base64 characters—i.e., the Base64 characters from i*MaxLength to CharNum−1; each sub-string is then inserted into the outbound array outArray [i] at the corresponding position.

Referring instead to block 440 (encrypted form), the maximum length MaxLength of the strings in the array of strings is set to a value that should allow their encryption individually; for example, considering that in the RSA encryption algorithm at most 117 bytes of data may be encrypted together, the maximum length MaxLength is set to 117 bytes=int(117/4)+1=29 64Base characters.

Proceeding to block 442, the sender starts filling the outbound array outArray[ ] by inserting the information of the title portion at its correct position. For example, the operations of reading the characteristics of the outbound file and inserting the information of the title portion into the outbound array outArray[ ] may be performed together with the following instructions:

outArray[0]="EncryptedFile"
outArray[1]=filename
outArray[2]=file.size
outArray[3]=getFilePermission( )
outArray[4]=file.lastWriteAccessUTC
outArray[5]=getMD5Has(fileName)
outArray[6]=getMIMEType(fileName)
outArray[7]="RSA-1024"
outArray[8]=myPublicKeyout
Array[9]=myModulus
outArray[10]=StartTitle+13
outArray[11]=StartTitle+13+StringNum−1
outArray[12]="/EncryptedFile", wherein myPublicKey and myModulus are the public key of the receiver and the modulus of the RSA algorithm (which have been extracted from the download request or the upload response).

The sender at block 444 then completes the filling of the outbound array outArray[ ] by inserting the information of the payload portion at its correct position (by performing the same loop as described above).

At this point, the sender at block 446 encrypts each string of the payload portion in the outbound array outArray[ ] (from outArray[outArray[10]] to outArray[outArray[11]]) with the public key myPublicKey (and the modulus myModulus).

The flow of activity then merges at block 448 (from the block 438 or from the block 446), wherein a SOAP message is created by inserting an array of strings, generated according to the outbound array outArray[ ], into its body. This SOAP message is then sent to the receiver at block 450.

Moving to the swim-lane of the receiver at block 452, the SOAP message is recognized as comprising a file in normal form on in encrypted form from the string 0 of its array of strings in the body part (when it is equal to the keyword "File" or to the keyword "EncryptedFile", respectively). In response thereto, the flow of activity branches at decision block 454 according to the form in which the file has been sent; if the file has been sent in normal form the block 456 is executed, whereas if the file has been sent in encrypted the blocks 458-462 are executed (with the process that then passes to block 464 in both cases).

Referring to block 456 (normal form), the strings of the payload portion are extracted from the array of strings (from the first position StartPayload=string 7 to the last position EndPayload=string 8), and they are inserted into a working inbound array inArray[ ] at corresponding positions (from the position 0 to the position EndPayload-StartPayload).

Referring instead to block 458 (encrypted form), the strings of the payload portion are extracted from the array of strings (from the first position StartPayload=string 10 to the last position EndPayload=string 11), and they are inserted into the inbound array in Array[ ] at corresponding positions (from the position 0 to the position EndPayload-StartPayload). The process then passes to block 460, wherein the public key of the sender (that has been used to encrypt the content of the file) and the modulus of the RSA encryption algorithm are extracted from the string 8 and the string 9, respectively, of the array of strings; the receiver then retrieves its private key associated with this public key (from its mass memory). Each string of the inbound array in Array[ ] (from in Array[0] to in Array[EndPayload–StartPayload]) is decrypted at block 462 by using the encryption algorithm (indicated in the string 7 of the array of strings) with these private key and modulus.

The flow of activity then merges at block 464 (from the block 456 or from the block 462), wherein an inbound Base64 string is created by concatenating the (possibly decrypted) strings of the inbound array in Array[ ] in succession (from in Array[0] to in Array[EndPayload–StartPayload]). Passing to block 466, the 64Base string is converted into a corresponding array of bytes representing the content of the file.

With reference now to block 468, a new (inbound) file with the name indicated in the string 1 of the array of strings is stored into the receiver with this content. Continuing to block 470, the characteristics of the inbound file are extracted from the title portion of the array of strings (i.e., its access permission from the string 3, its last write access from the string 4, and its MIME content-type from the string 6 in the example at issue). These characteristics are then applied to the inbound file at block 472; particularly, this means setting its access permission, its last write access and its MIME content-type to the values so obtained.

At this point, the integrity of the inbound file is verified at block 474. For example, this is achieved by comparing the actual size of the inbound file with the value indicated in the string 2 of the array of strings, and/or by calculating the MD5 hash value of the inbound file and comparing it with the value indicated in the string 5 of the array of strings. The flow of activity then branches at decision block 476 according to a result of this verification; if all the comparisons have been successful the block 478 is executed, whereas if one or more comparisons have failed the blocks 480-482 are executed (with the process that then passes to block 484 in both cases).

Referring to block 478 (successful verification), a result message is created with a corresponding return code (for example, RC=0).

Referring instead to block 480 (failed verification), the (corrupted) inbound file is deleted from the receiver. A result message is then created at block 482 with a return code indicative of the occurred error.

The flow of activity then merges at block 484 (from the block 478 or from the block 482), wherein the result message is returned to the sender. The process then ends at the concentric white/black stop circles 486 in the swim-lane of the sender.

The above-described solution may be implemented on a number of different protocols.

For example, this solution may be used to transfer files with the WebSocket protocol, which defines full-duplex communications using a single Transmission Control Protocol (TCP) connection. For this purpose, whenever a client needs to download a file from a server, a socket connection is created between the client and the server (with a corresponding handshaking phase). In response to a download request being submitted from the client, the server creates an XML file containing the same array of strings as above representing the file (in this case, with the content of the file that is converted into the UTF-8 format, since it is the only one supported by the WebSocket protocol) or a (UTF-8) long string containing all the strings of the array of strings separated by a special character (such as "\n"). The XML file or the long string is sent from the server to the client, which stores the corresponding file as above when the keywords "File" or "EncryptedFile" are found in the string 0 of the array of strings or shows its content into a web page as usual otherwise.

As a further example, this solution may be implemented on web services conforming to the REpresentational State Transfer (REST) architecture, which is based on the transfer of representations of resources (i.e., documents capturing the stare of any addressable concept). Indeed, the above-described solution meets the constraints of the REST architecture, since it is client/server, stateless, cacheable and with a uniform interface (i.e., the SOAP specification). In this way, it is possible to provide a transfer protocol that is full (i.e., supporting the concurrent transfer of more files) and secure (thanks to the encryption of the files) without degrading the performance of the REST web service architecture.

Another example of application of this solution is based on the Remote Procedure Call (RPC) protocol, which is used to invoke procedures in an external address space—for example, the XML-RPC protocol wherein the remote procedure calls are encoded in XML format. In this case, a receiver invokes a remote method onto a sender for transferring a file (passing the name of the file and possibly the public key and the modulus to be used to encrypt it); in response thereto, the sender returns a SOAP message containing the same array of strings as above representing the file.

In order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

For example, an aspect of the present disclosure provides a method for transferring files in a data-processing network. Similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

The method comprising the following steps under the control of a current node of the network. An outbound content and outbound characteristics of an outbound file (or more) are read. An outbound message comprising a set of (one or more) outbound strings, representing the outbound characteristics, and a set of (one or more) further outbound strings, representing the outbound content, is created. The outbound message is then sent to a receiver node of the network.

In addition or in alternative, the method comprises the following steps (under the control of the same current node of the network). An inbound message is received from a sender node of the network; the inbound message comprises a set of (one or more) inbound strings and a set of (one or more) further inbound strings. An inbound file (or more) having an inbound content corresponding to the further inbound strings is stored. Inbound characteristics indicated in the inbound strings are then applied to the inbound file.

Therefore, the above-described method may be used to download a file (from the sender), to upload a file (onto the receiver), or both of them—with the same solution that may also be extended to transfer two or more files in the same message.

In an aspect of the present disclosure, the step of creating an outbound message comprises inserting an outbound array of strings comprising the outbound strings and the further outbound strings into the outbound message. In addition or in alternative, the steps of storing an inbound file and applying inbound characteristics comprise extracting the inbound strings and the further inbound strings, respectively, from an inbound array of strings comprised in the inbound message.

However, the strings representing the characteristics of the file and its content may be organized in any other way (for example, into two distinct arrays of strings, or even simply into a single sequence of strings).

In an aspect of the present disclosure, the step of creating an outbound message comprises inserting one of a set of (one or more) predefined keywords into a first outbound string of the outbound array of strings. In addition or in alternative, the step of receiving an inbound message comprises recognizing the inbound message in response to one of these keywords being comprised in a first inbound string of the inbound array of string; the inbound strings in the inbound array of strings are then interpreted according to the keyword comprised in the first inbound string.

However, different types or numbers of keywords (even in different positions within the array of string) may be used to recognize each message being used to transfer a file—for example, by means of a single keyword for both the normal form and the encrypted form of the file (with the message that always comprises the strings for the information required to decrypt the file, which strings are empty when the file is in normal form).

In an aspect of the present disclosure, the step of creating an outbound message comprises encrypting the further outbound strings with a public key of the receiver node. In addition or in alternative, the step of storing an inbound file comprises decrypting the further inbound strings with a private key of the current node corresponding to the public key.

However, nothing prevents using any other encryption algorithm (even based on an asymmetric key); however, a basic implementation that only supports the transfer of normal files is not excluded.

In an aspect of the present disclosure, the step of creating an outbound message comprises inserting a representation of the public key into the outbound strings. In addition or in alternative, the step of storing an inbound file comprises retrieving the private key corresponding to the public key indicated in the inbound strings.

However, it is also possible to encrypt all the files that are sent to the receiver with a common public key that has been published by the receiver (without any need of sending it to the receiver in each message).

In an aspect of the present disclosure, the step of creating an outbound message comprises the following steps. In a scenario, the public key of the receiver node is extracted from a download request for downloading the outbound file that is received from the receiver node; in another scenario, the public key of the receiver node is extracted from an upload response that is received from the receiver node (with the upload response that is in response to an upload request for uploading the outbound file that has been submitted by the current node to the receiver node). In addition or in alternative, the method further comprises the following steps, before receiving an inbound message. In a scenario, the public key and the private key are generated, the public key is inserted into the download request, and the download request is submitted to the sender; in another scenario, the public key and the private key are generated in response to the upload request (which is received from the sender node), the public key is inserted into the upload response, and the upload response is returned to the sender node.

However, it is also possible to avoid generating a new pair of public/private keys for each file—for example, when the common public key being published by the receiver is used.

In an aspect of the disclosure, the outbound message is an outbound XML-based message; in addition or in alternative, the inbound message is an inbound XML-based message.

However, the possibility of encoding the strings used to transfer the file in any other serialization format—for example, Comma-Separated Values (CSV)—is not excluded.

In an aspect of the disclosure, the outbound message is an outbound SOAP message; in addition or in alternative, the inbound message is an inbound SOAP message.

However, any other transport protocol (even not XML-based) may be used to transfer the files—for example, simply the HTTP.

In an aspect of the disclosure, the outbound SOAP message comprises the outbound strings and the further outbound strings in a body thereof; in addition or in alternative, the inbound SOAP message comprises the inbound strings and the further inbound strings in a body thereof.

However, the possibility of adding extensions to the header of the SOAP messages is not excluded (even if it is far less advantageous).

In an aspect of the disclosure, the outbound characteristics and/or the inbound characteristics comprise a file name, an access permission indicator, at least one time stamp, and/or a content-type indicator.

However, similar, additional and/or alternative characteristics of the file are tenable (for example, indicating its creation time, author, and the like).

In an aspect of the disclosure, the step of creating an outbound message comprises converting the outbound content into an outbound sequence in text format, and segmenting the outbound sequence into the further outbound strings. In addition or in alternative, the further inbound strings are in text format; in this case, the step of storing an inbound file comprises concatenating the further inbound strings into an inbound sequence, and converting the inbound sequence into a binary format.

However, any other text format may be used (for example, the Unicode); however, the possibility of transferring the content of the file directly in its binary format is not excluded.

In an aspect of the disclosure, the method further comprises the following steps. A verification value (or more) of the inbound file is calculated; a correctness of the inbound file is then verified according to a comparison between each verification value and a corresponding one of the inbound characteristics.

However, any other action may be taken when this verification fails (for example, by retrying the transmission of the file); in any case, this feature is not strictly necessary and it may be omitted in a basic implementation.

In an aspect of the disclosure, said at least one verification value comprises a hash value of the inbound file.

However, any other type or number of characteristics of the file may be used to verify its correctness—for example, a Cyclic Redundancy Check (CRC) code.

Another aspect of the disclosure provides a node of a data-processing network, which comprises means for performing the steps of the above-described method.

Similar considerations apply if the node has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. More generally, the same solution may also be applied on a system based on a different architecture (for example, a local, wide area, global, cellular or satellite network), and exploiting any type of (wired and/or wireless) connections. In any case, each node of the network may have another structure or may comprise similar elements (such as cache memories temporarily storing the programs or parts thereof); moreover, it is possible to replace the corresponding computer with any code execution entity, either based on a physical machine or a virtual machine (such as a PDA, a mobile phone, and the like), or with a combination of multiple entities (such as a multi-tier architecture, a grid computing infrastructure, and the like).

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of transferring files in a data-processing network using a current node within the network, comprising:
reading an outbound content and outbound characteristics of an outbound file, wherein at least one outbound characteristic describes whether the file is to be sent as encrypted or sent as non-encrypted;
applying the outbound characteristics to the outbound file;
determining a maximum length to be used to create at least two sets of outbound strings;
creating an outbound XML-based, SOAP message wherein the at least two sets of outbound strings are inserted into the message including a first set of the outbound strings representing the outbound characteristics, wherein at least one of the outbound strings indicates the size of the outbound file;
and a second set of the outbound strings representing the outbound content, wherein the outbound strings representing the outbound content are text strings, and the outbound SOAP message comprises the first and second sets of the outbound strings in a body thereof and without any extensions in the outbound SOAP message header;
sending the outbound message to a receiver node within the network;
receiving an inbound XML-based, SOAP message from a sender node within the network, the inbound message comprising at least two sets of inbound strings including a first set of the inbound strings representing inbound characteristics and a second set of the inbound strings representing inbound content, wherein the inbound strings representing the inbound content are text strings, and the inbound SOAP message comprises the first and second sets of the inbound strings in a body thereof and without any extensions in the outbound SOAP message header;
extracting the inbound content from the second set of inbound strings wherein the inbound content is converted from text to binary;
storing an inbound file having the inbound content;
extracting from the first set of inbound strings the input characteristics, which includes at least the file size of the inbound file;
applying the inbound characteristics to the inbound file;
verifying the integrity of the inbound file by at least comparing the actual size of the inbound file with the file size indicated in the inbound characteristics;
communicating the results of the verification to the sender node.

2. The method of claim 1, wherein the creating includes encrypting the second set of the outbound strings with a public key of the receiver node; and the storing includes decrypting the second set of the inbound strings with a private key of the current node corresponding to the public key.

3. The method of claim 2, wherein the creating includes inserting a representation of the public key into the outbound strings; and the storing includes retrieving a private key corresponding to a public key indicated in the inbound strings.

4. The method of claim 3, wherein the creating includes extracting the public key of the receiver node from a download request for downloading the outbound file received from the receiver node; and further comprising, before receiving the inbound message, generating the public key and the private key, inserting the public key into the download request, and submitting the download request to the sender.

5. The method of claim 3, wherein the creating includes extracting the public key of the receiver node from an upload response received from the receiver node, the upload response in response to an upload request submitted by the current node to the receiver node; and further comprising, before receiving the inbound message, generating the public key and the private key in response to the upload request being received from the sender node, inserting the public key into the upload response, and returning the upload response to the sender node.

6. The method of claim 1, further comprising:
calculating verifications values of the inbound file; and
verifying a correctness of the inbound file based upon a comparison between each of the verification values and a corresponding one of the inbound characteristics.

7. The method of claim 6, wherein one of the verification values is a hash value of the inbound file.

8. The method of claim 1, further comprising:
inserting a predefined keyword into a first outbound string of the outbound strings; and recognizing a keyword within a first inbound string of the inbound strings; and interpreting the inbound strings based upon the keyword within the first inbound string.

9. The method of claim 1, wherein both the inbound and the outbound characteristics includes at least one of a file name, an access permission indicator, a time stamp, and a content-type indicator.

10. The method of claim 1, wherein the creating includes converting the outbound content into an outbound sequence in text format, and segmenting the outbound sequence into the second set of the outbound strings, the storing includes concatenating the second set of the inbound strings into an inbound sequence, and converting the inbound sequence into a binary format, and the second set of the inbound strings are in text format.

11. A current node within a data-processing network, comprising:
at least one processor, wherein the at least one processor is configured to perform and/or initiate:
reading an outbound content and outbound characteristics of an outbound file wherein at least one outbound characteristic describes whether the file is to be sent as encrypted or sent as non-encrypted;
applying the outbound characteristics to the outbound file;
determining a maximum length to be used to create at least two sets of outbound strings;
creating an outbound XML-based, SOAP message wherein the at least two sets of outbound strings are inserted into the message, including a first set of the outbound strings representing the outbound characteristics, wherein at least one of the outbound strings indicates the size of the outbound file;
and a second set of the outbound strings representing the outbound content; wherein the outbound strings representing the outbound content are text strings, and the outbound SOAP message comprises the first and second sets of the outbound strings in a body thereof and without any extensions in the outbound SOAP message header;
sending the outbound message to a receiver node within the network;
receiving an inbound XML-based, SOAP message from a sender node within the network, the inbound message comprising at least two sets of inbound strings including a first set of the inbound strings representing inbound characteristics and a second set of the inbound strings representing inbound content, wherein the inbound strings representing the inbound content are text strings, and the inbound SOAP message comprises the first and second sets of the inbound strings in a body thereof and without any extensions in the outbound SOAP message header;
extracting the inbound content from the second set of inbound strings wherein the inbound content is converted from text to binary;
storing an inbound file having the inbound content;
extracting from the first set of inbound strings the input characteristics, which includes at least the file size of the inbound file;
applying the inbound characteristics to the inbound file,
verifying the integrity of the inbound file by at least comparing the actual size of the inbound file with the file size indicated in the inbound characteristics;
communicating the results of the verification to the sender node.

12. A computer program product comprising:
a computer usable non-transitory storage medium having stored therein computer usable program code for transferring files in a data-processing network using a current node within the network, the computer usable program code, which when executed by a computer hardware system, causes the computer hardware system to perform:
reading an outbound content and outbound characteristics of an outbound file, wherein at least one outbound characteristic describes whether the file is to be sent as encrypted or sent as non-encrypted;
applying the outbound characteristics to the outbound file;
determining a maximum length to be used to create at least two sets of outbound strings;
creating an outbound XML-based, SOAP message wherein the at least two sets of outbound strings are inserted into the message including a first set of the outbound strings representing the outbound characteristics, wherein at least one of the outbound strings indicates the size of the outbound file;
and a second set of the outbound strings representing the outbound content, wherein the outbound strings representing the outbound content are text strings, and the outbound SOAP message comprises the first and second sets of the outbound strings in a body thereof and without any extensions in the outbound SOAP message header;
sending the outbound message to a receiver node within the network;

receiving an inbound XML-based, SOAP message from a sender node within the network, the inbound message comprising at least two sets of inbound strings including a first set of the inbound strings representing inbound characteristics and a second set of the inbound strings representing inbound content wherein the inbound strings representing the inbound content are text strings, and the inbound SOAP message comprises the first and second sets of the inbound strings in a body thereof and without any extensions in the outbound SOAP message header;

extracting the inbound content from the second set of inbound strings wherein the inbound content is converted from text to binary;

storing an inbound file having the inbound content;

extracting from the first set of inbound strings the input characteristics, which includes at least the file size of the inbound file;

applying the inbound characteristics to the inbound file;

verifying the integrity of the inbound file by at least comparing the actual size of the inbound file with the file size indicated in the inbound characteristics;

communicating the results of the verification to the sender node.

* * * * *